Patented June 16, 1925.

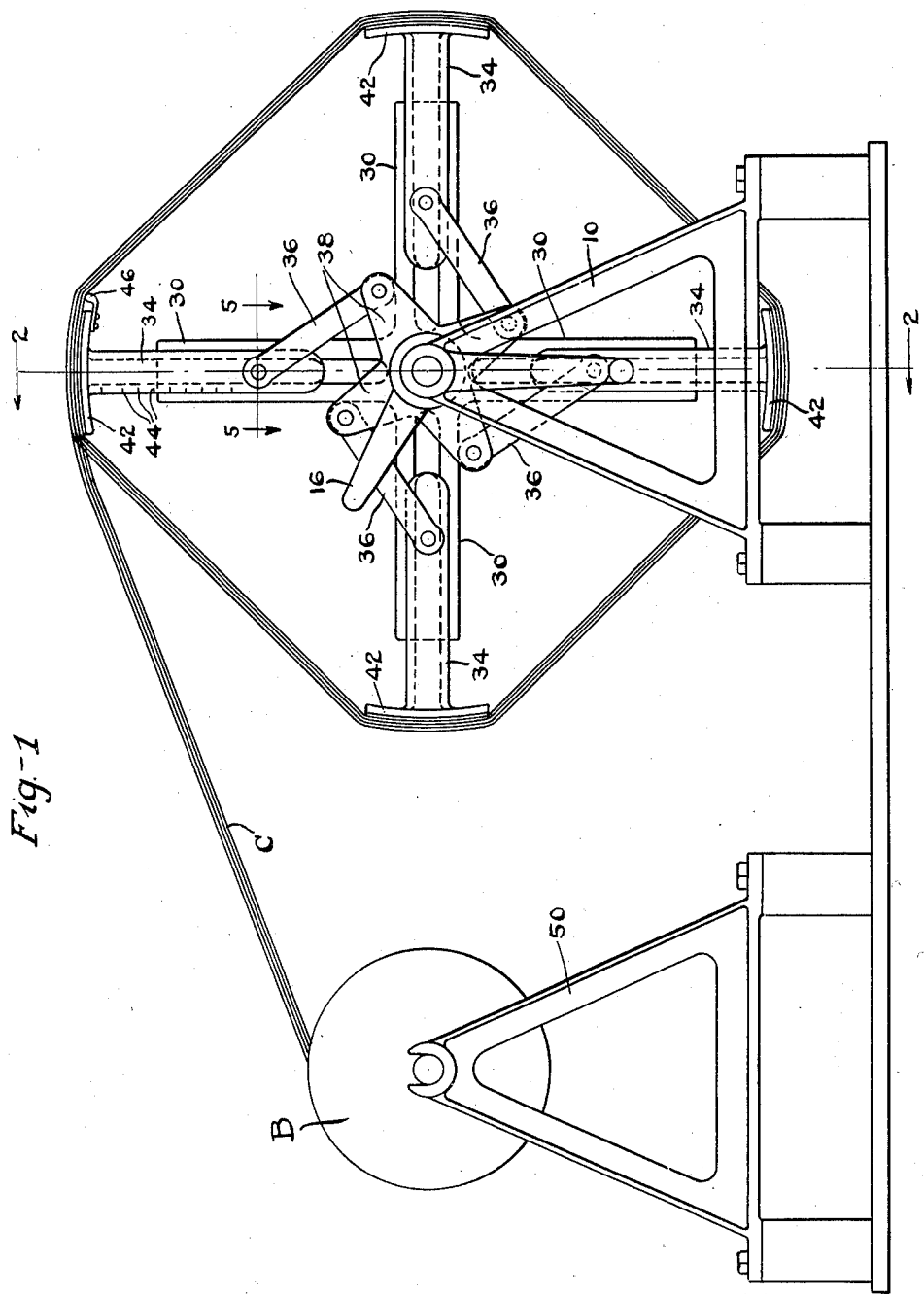

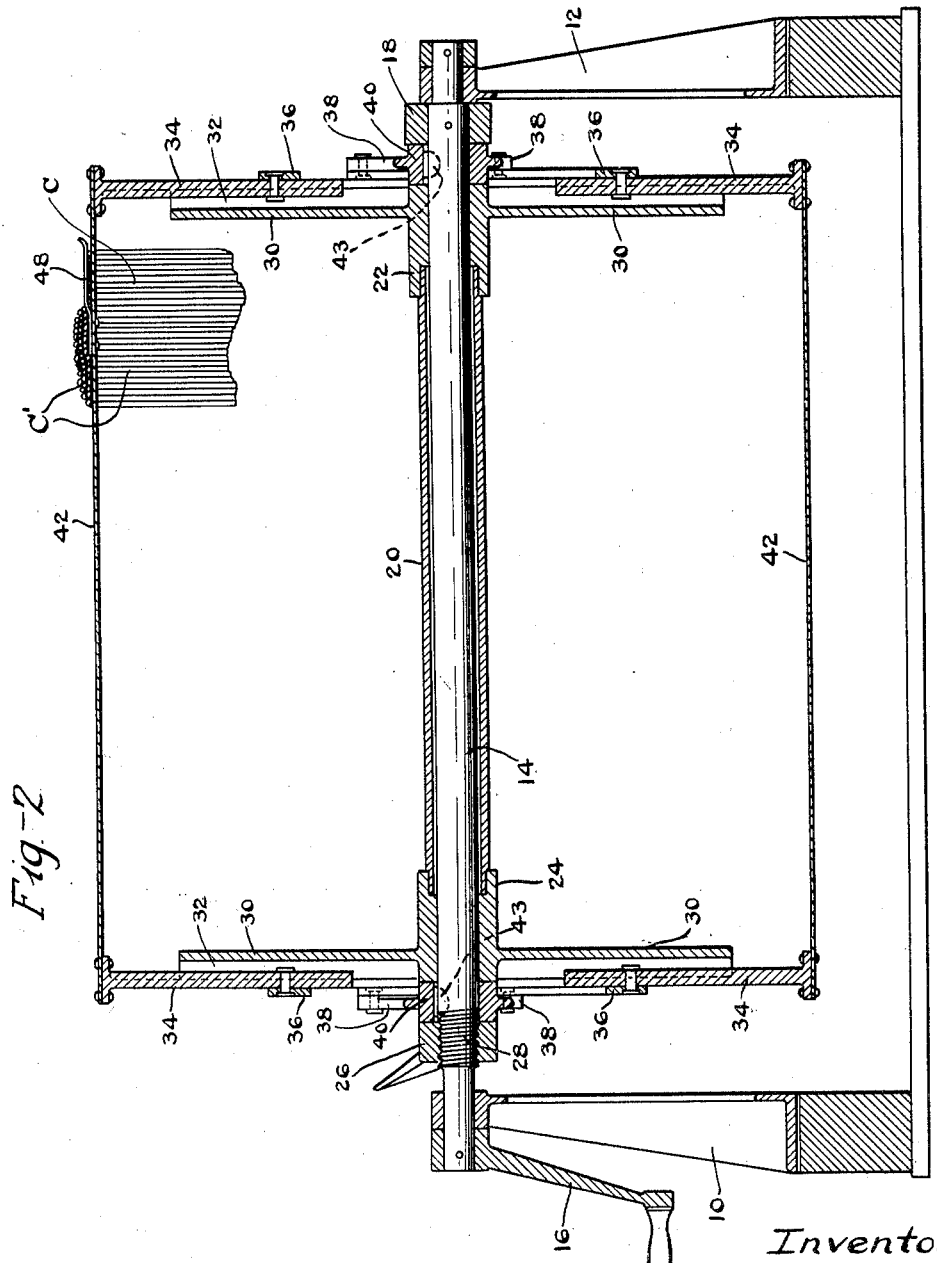

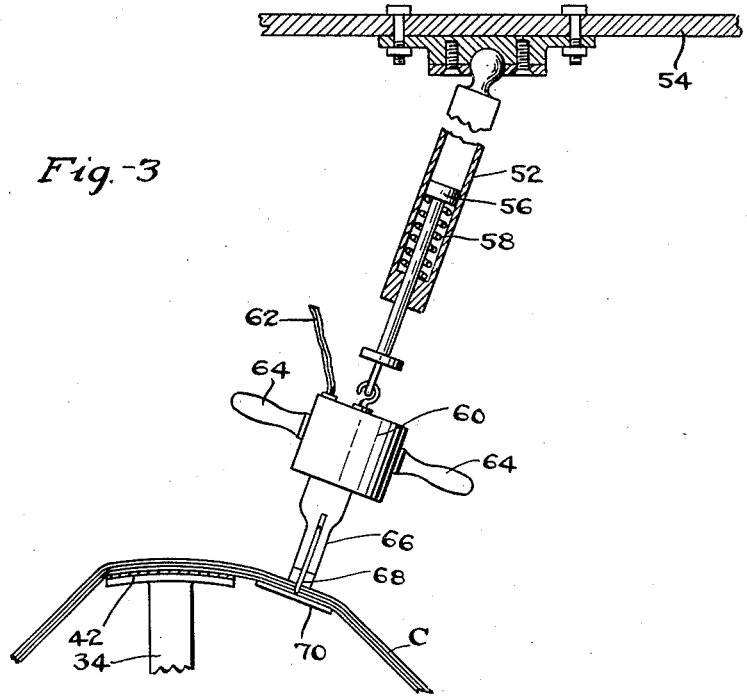
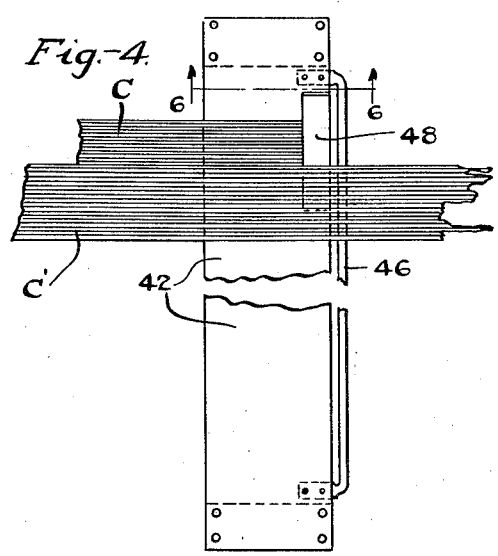
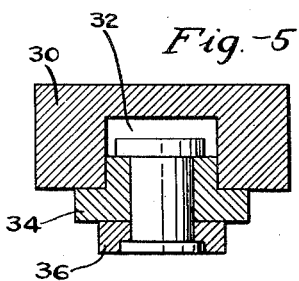

1,542,082

UNITED STATES PATENT OFFICE.

CHRISTIAN V. NELSON, OF MINNEAPOLIS, MINNESOTA, ASSIGNOR TO WASHBURN CROSBY COMPANY, OF MINNEAPOLIS, MINNESOTA, A CORPORATION.

CORD WINDING AND CUTTING DEVICE.

Application filed February 2, 1925. Serial No. 6,272.

*To all whom it may concern:*

Be it known that I, CHRISTIAN V. NELSON, a citizen of the United States, residing at Minneapolis, in the county of Hennepin and State of Minnesota, have invented certain new and useful Improvements in Cord Winding and Cutting Devices, of which the following is a specification.

My invention relates to cord winding and cutting devices and an object is to provide a device by means of which cord may be wound and cut to desired lengths. Before the time of my invention it was customary when sacks such as flour sacks and also various packages were to be tied, to guess at the length of cord which was to be cut off for this purpose and to cut off the pieces one at a time. The result was that the pieces were usually cut longer than necessary, since the workmen would naturally wish to insure against the piece of cord being too short. This method of cutting, therefore, resulted in considerable waste and also required considerable time. An object in particular, therefore, of my invention is to produce a device by means of which a large number of pieces of cord of uniform length may be cut at one time. Another object is to provide a device embodying a reel-like structure upon which a large number of turns of cord may be wound and cut and which structure can be contracted and expanded from time to time according to the size of the sack or package which is being tied at any particular time.

The full objects and advantages of my invention will appear in connection with the detailed description thereof and the novel features of my inventive idea will be particularly pointed out in the claims.

In the accompanying drawings, which illustrate a practical embodiment of my invention,—

Fig. 1 is an end elevational view of the device. Fig. 2 is a view in transverse section on the line 2—2 of Fig. 1. Fig. 3 is a fragmentary view of the device showing an electrically-operated cutter used in connection therewith. Fig. 4 is a top plan view of the device. Fig. 5 is a view in section on the line 5—5 of Fig. 1. Fig. 6 is a fragmentary view in section on the line 6—6 of Fig. 4.

Referring to the construction shown in the drawings, the numerals 10 and 12 designate two spaced standards which may be mounted upon any suitable support. The upper ends of the two standards are formed into bearings for a shaft 14, which may be rotated in any suitable manner, as by a handle 16 secured to one end thereof. A collar 18 is secured to the shaft near one end thereof so as to engage the inner edge of the bearing at this end of the shaft. A sleeve surrounding the shaft extends for a large portion of the length of the shaft but stops short of the ends thereof. For convenience of manufacture instead of being made in a single piece this sleeve is shown as having a middle tubular portion 20 whose ends are secured to collar portions 22 and 24 respectively. The collar 22 is spaced inwardly from the collar 18, while the collar 24 is spaced inwardly from a winged nut 26 which engages a threaded portion 28 of the shaft. Extending radially outwardly from each of the collars 22 and 24 are four equally spaced arms 30 which are provided with slideways 32, as best shown in Fig. 5. Slidably mounted in these slideways are arms 34 which are connected by links 36 with arms 38 extending out radially from two rings 40 positioned, respectively, between the collars 18 and 22 and the collar 24 and nut 26. Secured to the outer ends of the arms 34 so as to extend between corresponding pairs of these arms, located at opposite ends of the device, are four bars 42. If desired these bars may be curved so as to constitute portions of the surface of a cylinder. It is evident that when the nut 26 is turned down, the reel structure will be clamped firmly to the rings and to the shaft, but when the nut is loosened the rings and the shaft may be turned with relation to the reel structure so that the bars 42 will be moved either inwardly or outwardly. In order that the two rings 40 may be turned simultaneously they are provided with keys 43 engaging in keyways in the shaft 14. When the nut 26 is loosened the shaft may be given a partial rotation independently of the reel structure so that the rings may be turned in either direction as desired. One of the arms 34 carries graduations 44 for a purpose which will presently appear. One of the bars 42, preferably the one attached to the graduated arm, is provided with a guide rod 46 which is attached at its ends to the bar and is spaced from the edge thereof. This bar 42 near one end thereof is provided with a spring clip 48 for holding the ends of the cords.

Referring to Fig. 1, B designates a bobbin or spool from which the cord is to be rewound and cut. This bobbin is supported by standards 50, it being understood that there is one of these standards for each end of the bobbin. These bobbins are commonly wound with a plurality of cords C lying side by side. In the use of the device with a bobbin of this kind the ends of the plurality of cords are inserted under the clip 48 as shown in Fig. 4. The shaft 14 with the reel structure carried thereby is then rotated and the bunch of cords is wound upon the bars 42. In Figs. 2 and 4 C designates the bunch of cords wound during the first turn and C' designates the bunch of cords wound during the second turn. It is the intention to wind one layer, or at most only a small number of layers of cord on the reel so that it is not necessary to change the setting of the bars 42 during the winding operation, since the length of the cord which is cut will not appreciably increase by winding on two or three layers. However, it is desirable to be able to increase and decrease the length of the cut cords according to the size of the sacks or other objects which it is desired to tie with the cords. If the sacks or other objects which are to be tied are small, then the bars 42 will be set inwardly, while if they are larger the bars will be set outwardly. This may be readily accomplished by loosening the nut 26, thereby unclamping both of the rings 40 from the reel structure so that they may be turned independently thereof. By means of the links 36 the bars 42 will be moved in or out to shorten or lengthen the pieces of cord which are cut. The graduations 44 are so computed as to indicate the length of the pieces of cord which will be cut. When the proper amount of cord has been wound a knife is drawn between the guide rod 46 and the adjacent edge of the bar 42. It will be understood that the initial position for winding is preferably when the bar which carries the guide rod is uppermost, and that the winding is stopped with this bar again in uppermost position. Instead of cutting the cord with an ordinary knife the cord may be cut by means of an electrically-operated circular knife such as shown in Fig. 3. In the construction shown in this figure a cylinder 52 is swivelly attached at its upper end to a support 54. A plunger 56 is normally held upwardly in the cylinder by a spring 58, while an electric motor 60 is attached to the lower end of the plunger rod. This motor is provided with wires 62 for supplying current thereto and has attached handles 64 by means of which it can be swung. The motor has a downward extension 66 in which is mounted a circular knife 68 adapted to be rotated by the motor in well-known manner. Supported below the extension 66 is a finger 70 which moves underneath the cords when the motor is swung so that the cords are held up in position to be cut by the rotating knife. It will be understood that this electrically-operated knife may be used in connection with the identical reel structure which has already been described, so that the cord may be cut either by means of an ordinary knife in connection with the guide 46 or may be cut by means of the rotating knife. When the latter is not in use the spring 58 pulls it up out of the way, and when it is to be used the operator by grasping the two handles 64 may pull the motor and attached cutter down and swing them over the cords for cutting them. It is evident that my device may be used for winding cord to place it in condition for cutting regardless of whether or not the cord is originally wound upon the form of bobbin shown in the drawing.

I claim:

1. A cord winding and cutting device comprising a rotatable shaft, a plurality of bars arranged in parallel spaced relation around said shaft, means connecting the ends of said bars with said shaft, a clip attached to one of said bars for securing the end of cord which is to be wound, and a knife guide secured to said clip bearing bar in parallel spaced relation to a longitudinal edge thereof whereby the wound cord may be cut into pieces of uniform length by drawing a knife between said guide and the adjacent edge of said bar.

2. A cord winding and cutting device comprising a rotatable shaft, a sleeve mounted on said shaft, arms having slideways extending radially from the ends of said sleeve, arms slidably mounted in said slideways, bars secured to the outer ends of said slidable arms, said bars being arranged in parallel spaced relation around said shaft, rings slidably keyed to the end portions of said shaft adjacent the ends of said sleeve, links connecting said rings and said slidable arms whereby relative rotation of said shaft and sleeve when unclamped from each other will cause radial movement of said slidable arms, and means for clamping said sleeve to said shaft.

3. A cord winding and cutting device comprising a rotatable shaft, a plurality of bars arranged in parallel spaced relation around said shaft and supported thereby, an extensible support, a circular cutter carried by said support, means for rotating said cutter in a plane radially related to said shaft, and means for swingingly attaching said support whereby said cutter may be caused to travel parallel to and adjacent one of said bars for cutting the wound cord into pieces of uniform length.

In testimony whereof I hereunto affix my signature.

CHRISTIAN V. NELSON.